United States Patent [19]

Carroll et al.

[11] Patent Number: 4,549,264
[45] Date of Patent: Oct. 22, 1985

[54] TIME AND ACCOUNTING SYSTEM

[75] Inventors: Gary T. Carroll, Boulder County; Robert D. Hunter, Asanahoe County, both of Colo.

[73] Assignee: B.I. Incorporated, Boulder, Colo.

[21] Appl. No.: 539,049

[22] Filed: Oct. 4, 1983

[51] Int. Cl.⁴ .............................................. G01J 1/00
[52] U.S. Cl. ..................................... 364/406; 340/539; 235/380
[58] Field of Search ............... 364/406; 340/531, 539, 340/534, 573, 572, 571, 506, 825.49; 375/23; 455/31, 343; 235/380

[56] References Cited

U.S. PATENT DOCUMENTS

| | | | |
|---|---|---|---|
| 3,478,344 | 6/1965 | Schwitzgebel et al. | 340/539 |
| 3,805,265 | 4/1974 | Lester | 340/825.49 |
| 3,806,874 | 4/1974 | Ehrat | 235/380 |
| 3,984,807 | 10/1976 | Haemmig | 375/23 |
| 4,101,873 | 7/1978 | Anderson et al. | 455/31 |
| 4,225,953 | 9/1980 | Simon et al. | 340/825.49 |
| 4,275,385 | 6/1981 | White | 340/525 |
| 4,296,408 | 10/1981 | Neuringer | 340/825.49 |
| 4,347,501 | 8/1982 | Akerberg | 340/531 |
| 4,464,792 | 8/1984 | Owerko | 340/539 |
| 4,476,461 | 10/1984 | Carubia | 340/539 |

FOREIGN PATENT DOCUMENTS

0965179  3/1975  Canada ........................ 340/825.49

Primary Examiner—Michael R. Fleming
Attorney, Agent, or Firm—Bryant R. Gold

[57] ABSTRACT

A system for automatically logging the interaction between a plurality of objects. Small, self-contained transmitting beacon units are attached to a first set of objects. These beacon units transmit a uniquely coded signal at prescribed intervals. A small, self-contained portable transceiving unit is attached to a second set of objects. The second set of objects typically moves in, about, and among the first set of objects, although either set may move relative to the other. The signals transmitted by the beacon units have a limited range. If the transceiving unit is within this range for a specified period of time, the unique code associated with the transmitted signal is time-logged into a memory element contained within the portable receiving unit. At the end of a specified period of time, such as a work day, the contents of the memory of the transceiving unit may be examined to determine the objects with which an interaction has been had during the time period. A computer may be used to analyze, sort, and generate reports from the data thus logged within the transceiving units. The system is particularly well suited for use as a time and accounting system in a custodial environment, such as a hospital or similar facility.

22 Claims, 11 Drawing Figures

TIME AND ACCOUNTING SYSTEM

BACKGROUND OF THE INVENTION

The present invention relates to a system for automatically logging the interaction between different objects, and for using this logged information in order to generate detailed reports, studies, and similar information. More particularly, the invention relates to a time and accounting system wherein the interaction between objects, at least one of which is moveable, is automatically and accurately recorded, thereby allowing detailed time studies, reports, billing statements, and the like to be quickly and accurately prepared.

Numerous methods have been used in the past for keeping track of the interactions that occur between two groups of objects, at least one group of which regularly moves relative to the others. One of the most common applications of such systems to date relates to the field of personnel time, care, and accounting systems. Hospitals, prisons, schools, factories, and other custodial institutions are the types of facilities where accurate records are often needed to indicate which personnel have come in contact with other personnel or objects during a specified period of time. In a hospital or health care facility, for example, accurate records must be maintained indicating when and for how long specified hospital employees, such as doctors or nurses, have come in contact with individual patients. Further, in order to operate such facilities efficiently, and thereby reduce operating costs, it is often necessary to perform time studies and the like to evaluate the most efficient use of the available personnel. Moreover, while many employees in such custodial facilities are typically paid on the basis of the number of hours worked, it is sometimes preferred to adjust wages based on the actual performance of the employee, e.g., where the employee has been within the facility, and/or how many specified contacts have been made during a given time period with other objects, patients, students, or the like.

Heretofore, such time care and accounting functions have largely been carried out manually. That is, a written log is maintained at an appropriate location and a written entry is manually made therein to indicate that a certain activity has occurred. The log entries must then be analyzed and sorted as required in order to reach the desired end result—a report, billing statement, paycheck, etc.

While computers have been used extensively in recent years to help analyze this kind of log-entry type data, the data must still typically be manually entered into the computer system. Manual log entries, whether to initially record the particular event, and/or to enter the logged event into a computer system, are undesirable because they are prone to err and they consume valuable time.

Some attempts have been made in the art to automatically generate an identifying log-event signal that is received at a central location, whereat it may be used to signal that the particular event thas transpired and/or the location at which the event occurred. For example, in U.S. Pat. No. 3,478,344, there is disclosed a system for monitoring the behavior of supervised individuals. The system includes a portable transceiver worn on the wrist of the supervised individual. This portable transceiver is designed to respond to a interrogating signal received from a central station, and in response to this interrogating signal to transmit a coded signal back to the central station through a directional antenna system. When received at the central location, the signal indicates not only the location of the portable transceiver, but the identity (code) of the source of the signal. In this way, the location or position of a particular supervised individual within a specified boundary area may be monitored without disturbing the individual being watched. Moreover, should the individual wearing the wristband transceiver unit attempt to destroy the unit, self-actuating means are triggered that transmit a higher power signal back to the central station, thereby alerting the central station of the attempted destruction of the signal source.

Unfortunately, the system disclosed in U.S. Pat. No. 3,478,344 only gives an indication of the location of the supervised individual and the occurrence of a single event (attempted destruction of the device). Further, location information is only sent through the use of a directional antenna system, which requires that specialized antennas be strategically placed throughout the supervised area. Also, the wrist transceiver unit requires a rather cumbersome battery pack, worn on the belt on the supervised individual, in order to have power to operate. The device could thereby be easily rendered inoperable by merely disconnecting the power source from the transceiver (e.g., by cutting the wires). Such a system is, of course, ill suited for a hospital, healthcare, or similar custodial facility because of the high power radiation signals that may be emitted from the device. Radiation signals in a hospital environment could easily interfer with sensitive monitoring equipment or could even be a hazard to the health of some of the patients (e.g., a patient using a pace maker).

In U.S. Pat. No. 4,347,501, an alarm signalling system is disclosed for use in hospitals, prisons, and similar custodial institutions. According to its teachings, an alarm signalling device—a portable unit that is easily carried in the pocket of a supervised individual—transmits an alarm signal whenever it is manually triggered by the person using the device. Each room or zone of the building or enclosed area where the supervised individuals are housed has a room code associated therewith. The alarm signalling device is adapted to have the room code set therein (through inductive transmission) whenever the device is carried into a given room or area. The set room code is automatically changed when the alarm sending device is carried from one room or location to another. When the manual alarm button is activated, the latest stored room code is sent by radio transmission to a central alarm receiver, where the information can be acted upon to get the needed assistance to the identified room or location as soon as possible.

While the system disclosed in U.S. Pat. No. 4,347,501 offers the advantage of a small portable unit that can have a single location code stored therein, the system must be manually activated before the room or location code may be acted upon. Further, the system does not provide any capability for logging a history of all the rooms or locations in which the unit has been carried over a period of time. That is, the device (as an alarm unit) is only concerned with the present, not the past; and to recreate the past, some means would have to be used to transmit the previous location code back to the central station whenever a new code was entered therein. This would require much more complex circuitry, especially at the central receiving station where the possibility of receiving two or more alarm signals simultaneously from different portable units would have to be provided for. Such provisions (for handling two or more signals simultaneously) typically include using different radio transmission frequencies for each portable unit, including some complex buffering and interlocks schemes so that the information could eventually be combined, analyzed, and acted upon. As already mentioned, in a hospital or similar sensitive environment, it is generally preferable to minimize the use of radio transmission (radiation). If such radiation must be used, power levels must be kept low—meaning that transmission distances must be kept extremely short—and only a very small number of non-interferring frequencies should be used.

SUMMARY OF THE INVENTION

The present invention provides a unique system for automatically logging the interaction between a plurality of objects, and for quickly and efficiently analyzing, sorting, and combining this information into more usable forms. Small, self-powered transmitting units are selectively attached to a first set of objects. These units are adapted to transmit a uniquely coded signal at prescribed intervals, e.g., every fifteen seconds. A small self-powdered, portable transceiving unit is likewise selectively attached to a second set of objects, which second set of objects typically moves in, about, and among the first set of objects. (Advantagously, the first set of objects may also move in, about, and among the second set of objects). If the portable transceiving unit comes and remains within a specified distance of the transmitting unit for a predetermined period of time (e.g., for at least 30-45 seconds), the transceiving unit stores the unique code contained within the signal received from the transmitting unit in a specified memory location. This memory location is uniquely assigned to a specified time interval. That is, the memory of the portable transceiving unit is advantagously divided into memory cells corresponding to a specified time interval, such as one memory location or cell for every minute of a given time period. Hence, as the portable transceiving unit interacts with the transmitting units (that is, as the transceiving unit comes and remains within the specified distance of the various transmitting units for the specified period of time) the transceiving unit logs into its memory at a location corresponding to the time at which the interaction occurred the unique code of the transmitting unit with which it interacted. At the end of a specified time period, e.g., at the end of a work day, the memory contents of the transceiving unit may be examined and analyzed to accurately recreate the interactions that occurred between the object to which the portable transceiving unit was attached and the objects to which the transmitting units were attached.

In a preferred embodiment of the present invention, the self-contained transmitting or beacon units may be selectively attached to patients, inmates, students, or other supervised personnel who are housed in a custodial facility. The portable transceiving units may then be selectively attached to supervisory personnel, such as nurses, doctors, guards, teachers, and the like. The supervisory personnel may then interact with the supervised personnel throughout a given work day without needing to consciously make any log entries as to which supervised personnel they have come in contact with during the day. Rather, a unique code assigned to the transmitting unit of each supervised personnel will be automatically time-logged into the memory of the supervisory personnel's transceiving units whenever a specified contact (within a specified distance for a specified time) is maintained. At the end of the day or work shift, the memory contents of the supervisory personnels' transceiving units may be individually and collectively examined so as to create an accurate history of those supervised individuals with whom the supervisory personnel have come in contact with during the day. Advantageously, the memory content of the transceiving units may be downloaded to a central computer at the end of the work day, thereby allowing the analysis, sorting, and report generation of the time-logged data to be quickly and efficiently performed.

In one embodiment of the invention, the transceiving units may advantageously be placed in a charging unit after the end of a given work day so that batteries contained therewithin may be recharged. During this recharging period, the contents of the memory of the transceiving unit may be downloaded to a central computer system. Moreover, the time at which the transceiving unit is removed from the charging unit at the beginning of a work day, and the time at which the transceiving unit is returned to the charging unit at the end of a work day, may also be automatically time-logged into either the memory of the transceiving unit or directly to the central computer. Thus, when the transceiving unit is assigned to a specific supervisory personnel, the time-in/time-out information may replace the function of a conventional time card system.

In a further embodiment of the invention, particuarlly when the invention is to be used in a rather large facility and wherein it would be desirous to know the location of given supervisory personnel throughout the work day, a stationary transceiver unit may be selectively positioned at key locations throughout the facility. This stationary unit is adapted to periodically transmit an interrogate signal over a very short range (e.g., 5-10 feet). If a portable transceiving unit is within the range of the stationary unit, the interrogate signal is received by the portable transceiving unit. The reception of the interrogate signal causes the portable transceiving unit to respond by transmitting back to the stationary unit a uniquely coded identifying signal. The stationary tran­sceiving unit then sends this information to a central processing unit (CPU), thereby allowing the computer to keep a record of the location of each portable transceiving unit within the large facility at identified times. This information is very useful in performing time studies and the like.

The principle advantages of the invention are that detailed, accurate, logs may be generated automatically without any real conscious effort on the part of the supervisory personnel. All the supervisory personnel need do is to pick up the portable transceiving units at the beginning of the work day, carry this unit throughout the day, and return it to the designated area at the end of the work day. Further, the collective information provided in the memories of all of the transceiving units carried by all the supervisory personnel will also provide a very accurate, detailed record of the contact the supervised individuals have had with the various supervisory personnel. Thus, in case of a hospital for example, accurate patient records will be generated that reflect, in increments as small as a minute, the care that has been received by the patient. Such accurate records will make the generation of accurate billing statements a readily achievable goal. Moreover, the detailed reports, required for many custodial institutions (such as those required by governmental regulations), will be easily generated by using the information logged into the central computer over a period of time (e.g. weeks or months).

It is thus seen that the present invention provides a system wherein much of the manual, painstaking, entry of time/accounting data is eliminated, thereby reducing the operating costs of many institutions where such information must be kept. Moreover, the accuracy and completeness of the time/accounting data is greatly improved over what is achievable with prior art systems.

BRIEF DESCRIPTION OF THE DRAWINGS

The above and other objects, features, and advantages of the present invention will be more apparent from the following more particular description thereof presented in conjunction with the following drawings, wherein.

DESCRIPTION OF THE PREFERRED EMBODIMENT

The following description is of the best presently contemplated mode of carrying out the invention. This description, which relates to use of the present invention in a hospital environment, is not to be taken in a limiting sense, but is made merely for the purpose of describing the general operating principles of the invention. The scope of the invention should be determined with reference to the appended claims.

Figure 1:
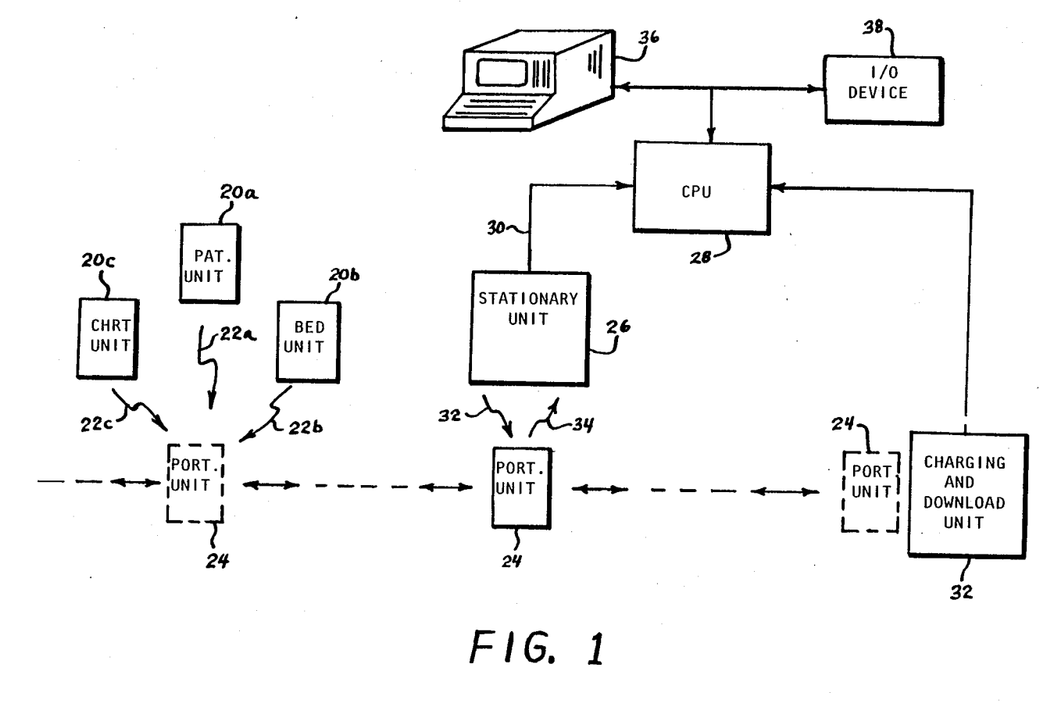
FIG. 1 is a block diagram illustrating the principle elements of one embodiment of the present invention.

Referring to FIG. 1, the present invention includes a selfcontained transmitting unit that may be selectively attached to various objects asssociated with a given patient in a hospital environment. For example, a patient transmitting unit 20a may be physically attached to the wrist or ankle of the patient. A similar transmitting unit 20b may be attached to the bed of the patient. Likewise, a similar transmitting unit 20c may be attached to the medical chart of the patient. As explained more fully below, each of the transmitting units 20 transmit a uniquely coded signal, represented symbolically in FIG. 1 as the wavy arrows 22a, 22b, and 22c, at prescribed intervals. For example, each transmitting unit 20 may transmit its uniquely coded signal every 15 seconds.

A portable self-contained transceiving unit 24 is adapted to be worn by selected hospital personnel, such as nurses or doctors. If the portable unit 24 comes within a specified distance of any one of the transmitting units 20 for a specified period of time, then the unique code associated with the transmitted signals 22a, 22b, and 22c is time-logged into the memory of the portable unit 24. Typically, for a hospital environment, the portable unit 24 must come within five feet of a patient unit 20a, bed unit 20b or chart unit 20c for at least 30 seconds before the unique code associated with the patient, bed or chart will be stored in a memory location of the portable unit 24.

Selectively placed at key locations throughout the hospital are stationary units 26. These stationary units will typically be coupled to a central CPU 28 over a suitable signal channel 30. The stationary unit 26 transmits a interrogating signal, represented as the wavy arrow 32 at specified intervals, e.g., every second. If a portable unit 24 is within a specified distance of the stationary unit 26 when the interrogate signal 32 is transmitted, i.e., if the doctor or nurse carrying the portable unit 24 happens to be walking by the stationary unit 26, then the portable unit responds by transmitting a response signal 34 back to the stationary unit 26. The response signal 34 includes a code that uniquely identifies the particular portable transceiving unit 24 that is within the specified distance of the stationary unit 26. The stationary unit receives this code and sends it to the CPU 28. The interrogate and response signals 32 and 34 thereby provide a means whereby the proximity of selected personnel to the various stationary units 26 may be determined.

At the end of the day, the portable unit 24 is placed in a charging and download unit 32. The charging and download unit 32 is also coupled to the CPU 28 via a suitable channel 34. One purpose of the charging and download unit 32 is to charge the batteries that are contained within the portable unit 24. Another purpose of the unit 32 is to transfer the contents of the memory of the portable unit 24 to the CPU 28 via the channel 34. A further purpose of the charging and download unit 32 is to signal the CPU 28 as to the times at which the portable unit 24 is removed therefrom at the beginning of a work day or shift, and the time at which the portable unit is returned thereto at the end of the work day or shift. Because the portable unit 24 has a unique code associated therewith, the removal/replacement of the portable unit 24 from the charging and download unit 32 thus generates signals which provide the CPU 28 with time-in/time-out information, which information can be used to replace a conventional time card system.

Coupled to the CPU 28 are suitable input/output (I/O) devices that allow operator interaction with the CPU. For example, a conventional CRT terminal 36 may be coupled to the CPU 28 to allow an operator to interact with the CPU 28. Other suitable I/O devices 38, such as a printer, will also typically be used.

In operation, a doctor or nurse will have a specific portable unit 24 assigned to him or her. Upon removal of the portable unit 24 from the charging and download unit 32, a signal will be generated to indicate to the CPU 28 that the particular portable unit 24 has been removed, thereby indicating that the particular doctor or nurse is on the job and working. Throughout the work day, as the portable unit 24 is carried within a specified distance, e.g. five feet, of the various stationary units 26 placed throughout the hospital, signals will also be generated and transferred to the CPU 28 indicating that at that particular time the particular portable unit 24 passed by that specific stationary unit. Further, as the particular portable unit comes within a specified distance, e.g., five feet, of a given patient, the patient's bed, or the patient's chart for a specified time, e.g., at least 30 seconds, a unique code associated with that particular patient, bed, or chart will be time-logged into the memory of the portable unit indicating that these events have occurred. A memory location is reserved within the portable unit for every time interval, e.g. every minute of the work day. Hence, if the nurse or doctor carrying the portable unit 24 is near a particular patient for the specified time period, (i.e., if the nurse or doctor "interacts" with the patient) that patient's code will be logged into the memory corresponding to that particular minute of the day when the interaction occurs. If the doctor or nurse is not within the specified distance of a patient, a patient's bed, or patient's chart (or any other object or item of interest to which a suitable transmitting unit has been attached) for the specified time period, then there will be no code logged into the memory corresponding to those minutes of the day when no such contact or interaction occurred. At the end of the day, when the portable unit is returned to the charging and download unit 32, a signal is likewise generated so that the CPU 28 can determine the precise time at which the portable unit 24 was returned. Also, the information stored in each memory location of the portable unit is downloaded from memory and transferred to the CPU 28 over the channel 34. Advantageously, this information indicates the interaction that occurred between the portable unit 24 and the various transmitting units 20 for every minute of the work day.

From the information transferred to the CPU 28, very detailed and accurate reports may be readily generated indicating the activities of any given hospital personnel (to which a portable unit 24 was assigned), as well as the detailed information as to which hospital personnel have come in contact with a specific patient. This detailed information is invaluable for preparing accurate billing statements for the patient. For example, the combined information obtained from all of the portable units 24 carried by the hospital personnel for a given day may indicate that a particular patient came in contact with a given doctor for three minutes, and that the doctor was in contact with the patient's chart for two minutes. The information might also indicate that several nurses made contact with the patient for various time periods throughout the day, including contact with the patient's chart and patient's bed. Such information will allow a very detailed billing statement to be prepared for the patient, and the billing statement may be automatically generated with a minimum of manual effort.

Similarily, the information contained within the CPU provides an invaluable data base for performing time studies to indicate the movement of the various hospital personnel throughout the hospital on a given day or within a given time period. This information is again prepared with a minimum of manual or conscious effort. Typically, computer terminals 36 also be positioned throughout the hospital, such as at every nurses station.

These remote terminals will not only allow the doctors and other hospital personnel to make contact with the CPU in order to review a given patient's history, but they also facilitate the easy entry of specific information into the CPU for a given patient, such as the type of medicine that is being administered, the quantity thereof, etc.

Advantageously, as seen in FIG. 1, all of the signals that must be transmitted from one unit to another need only be transmitted a very short distance. This means that the power level of such signals can be extremely low, thereby precluding any of the dangers that may otherwise result from transmitting radio signals (electromagnetic radiation) within a hospital environment. Further, as explained more fully below, because of the technology used, a single frequency, or at most two frequencies, may be used in order to allow the various transmissions to occur. These frequencies may be selected to be within a non-interfering frequency band, thereby insuring that no harmful effects will result.

Figure 2:
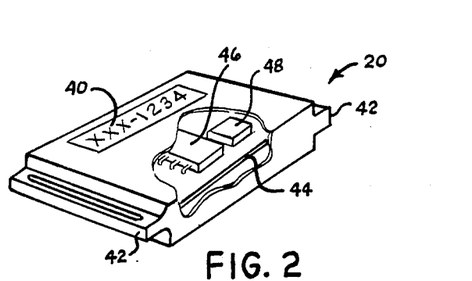
FIG. 2 is a cut away perspective view of one embodiment of a self-contained transmitting unit that could be used to realize the chart, patient, or bed units of FIG. 1.

Referring next to FIG. 2, a perspective view of a transmitting unit 20 is pictured with a portion thereof cut away. The unit is preferably a self-contained unit, including a battery, that is sealed in a suitable substance, such as polyurethane. If desired, the entire device can be thrown away once the battery contained therein has worn out. The device is immersible, thereby providing for its easy sterilization. An identifying number 40 is embossed directly on the package of the device to permanently identify the code that is transmitted by the device. Suitable mounting loops 42, or other connecting means, are used to facilitate the fastening of the device to a desired object, such as to a patient, a patient's chart, a patient's bed, or the like. Inside the device, a single printed circuit board 44 is used upon which an intergrated circuit package 46 and other electronic components 48 are attached. Once the printed circuit board has been fabricated and tested, the entire device is sealed in polyurethene, or other suitable material, thereby providing a protective package for the circuitry throughout the life thereof. As indicated, for a hospital environment, the polyurethene or other packaging material is also immersible, thereby allowing the device to be worn at all times, and thereby protecting the device from any hostile environments to which it may be exposed.

Figure 3:
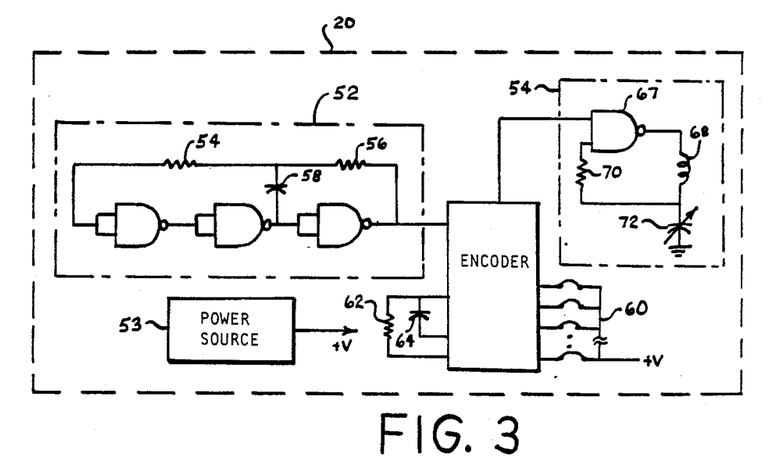
FIG. 3 is an electrical schematic diagram of the transmitting unit.

FIG. 3 shows an electrical block diagram of the circuitry that is used within the transmitting or beacon device 20 of FIG. 2. The circuitry includes an encoder 50, a timer circuit 52, a power source 53, and a transmitting circuit 54. The power source 53 may be a conventional battery. The timer circuit 52 may be set to any suitable frequency depending upon the particular application. A simple ring oscillator, realized using conventional logic gates connected in series as shown, may be used for this oscillator. The period of oscillation is selected by specifying the values of the resistors 54, 56 and the capacitor 58. The encoder 50 is realized using a conventional commercially-available encoder circuit, such as is commonly used in garage-door openers. Such circuits allow a unique code, as determined by selectively opening the series of contacts 60, to be readily set for each device during the manufacture thereof. A suitable device that could be used for the encoder 50 is a ED-15, manufactured by Supertex. The resistor 62 and capacitor 64 are used with such circuits to define the length of a bit of data associated with the unique code. That is, the unique code defined by selectively opening the connections 60 is transmitted serially over signal line 66 to the transmitting circuit 54. The width or duration of each bit within this serial chain of bits is determined by the resistor 62 and capicator 64. In contrast, the frequency or repitition rate with which the entire coded word is transmitted to the transmitting circuit 54 is determined by the period of oscillation of the oscillator timing circuit 52. As explained previously, in the preferred embodiment, the coded words would be transmitted in a burst only about every 15 seconds.

The transmitting circuit 54 can be realized using a conventional NAND gate, the output of which is connected to a suitable inductive coil 68, the other end of which is coupled through a resistor 70 back to an input of the NAND gate 67. A capacitor 72 ties the common end of the inductive coil 68 and resistor 70 to ground. The specific values of the inductor 68 and capacitor 72 are selected so that the circuit is "tuned" at the desired transmission frequency.

Figure 4:
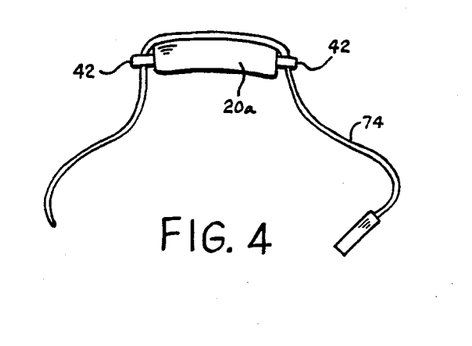
FIG. 4 is a side view of a transmitting unit attached to a wrist band, thereby facilating its easy attachment to a person.

Referring next to FIG. 4, there is shown a transmitting unit 20 to which a wrist band 74 has been attached through the mounting loops 42. In the preferred embodiment, this wrist band 74 may be of a conventional type presently used by hospitals to place ID braclets on patients.

Figure 5:
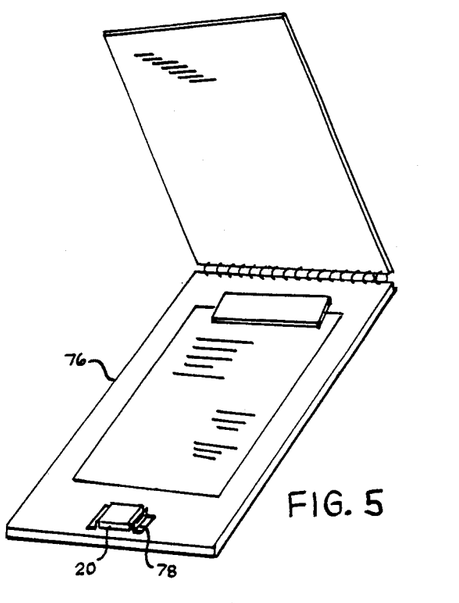
FIG. 5 is a perspective view of a bed chart to which a transmitting unit of the type shown in FIG. 2 may be attached.

Referring next to FIG. 5, a perspective view of a typical hospital patient chart 76 is shown. The transmitting unit 20 may be readily affixed thereto by means of any conventional clamping or affixing means 78.

Figure 6:
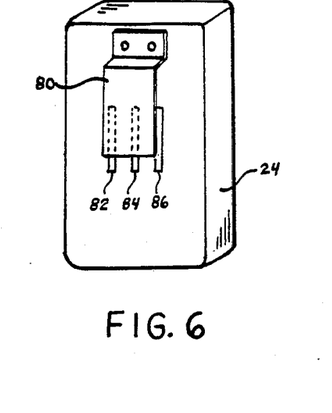
FIG. 6 is a perspective view of one embodiment of the portable transceiving unit of FIG. 1.

Referring next to FIG. 6, there is shown a perspective view of one embodiment of the portable transceiving unit 24. The view shown is from the back side thereof, and shows a protruding hook or clip 80 that is used to fasten the unit 24 to the belt or other clothing or garment of the user thereof. This same hook or clip 80 may also be used to fasten the unit to the charging and download unit 32 at the end of the work shift. Exposed slots 82, 84, and 86, or equivalents, are likewise provided on the unit 24 so as to provide direct electrical connection with the charging and download unit 32 when the portable unit 24 is placed therein at the end of the work shift. Alternatively, signals transmitted from the transceiving unit 24 to the charging and download unit 32 may be inductively coupled from one unit to the other without the need of a direct electrical connection. Similarly, the batteries or battery within the portable unit 24 may be recharged by power derived from an inductively coupled power signal received from the charging and download unit 32. Inductively coupling a power signal in this fashion is fully disclosed in pending patent application Ser. No. 437,841, filed Oct. 29, 1982, assigned to the same assignee as in the present application.

Figure 7:
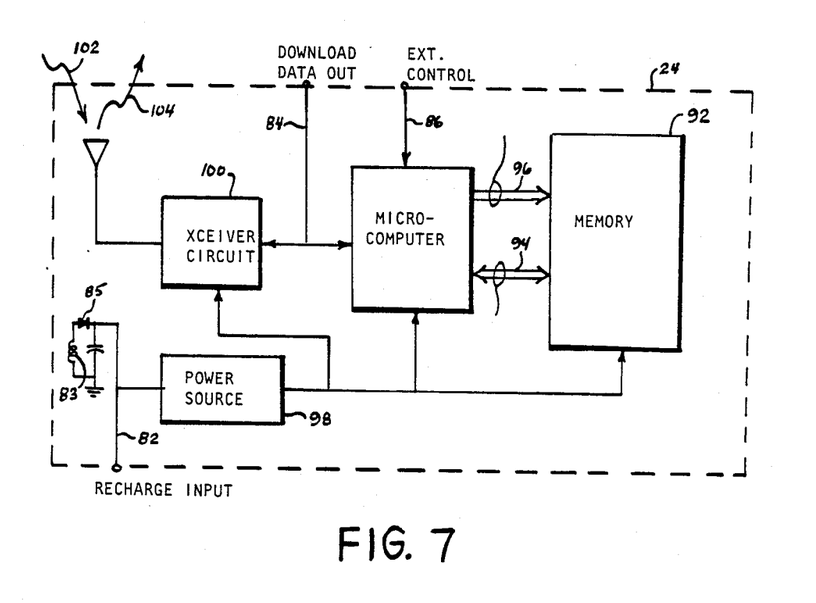
FIG. 7 is an electrical block diagram of the portable transceiving unit of FIGS. 1 and 6.

FIG. 7 is an electrical block diagram of the circuitry employed within the portable charging unit 24. The heart of the unit 24 is a microcomputer 90 having a suitable memory element 92 coupled thereto. Data can be readily transferred between the microcomputer 90 and memory 92 over the data bus 94. The particular address to or from which data is to be written or read is specified by the microcomputer 90 over an address bus 96. A rechargeable power source 98 provides the needed power for the microcomputer 90 and memory 92, as well as for the transceiver circuit 100. The transceiver circuit 100 receives signals 102 and passes the information contained therein to the microcomputer 90. It also receives data from the microcomputer 90 and allows it to be transmitted as signals 104. The transceiver circuit 100 may be of any conventional design.

As indicated previously, a feature of the present invention is the manner in which the memory 92 is allocated. A particular memory location within the memory element 92 is set aside for a desired time interval within the time during which the portable unit 24 is used. In the preferred embodiment, the memory element 92 is a conventional CMOS 16K RAM memory, such as the model 5516 RAM manufactured by Toshiba. As those skilled in the art recognize, such a memory may have over 2000 eight bit words stored therein. Therefore, by setting aside an eight bit word memory location for each minute, enough memory locations are provided for over 17 hours of operation. Advantageously, this means that the particular portable transceiving unit 24 could be used through two consecutive eight hour work shifts by two different nurses, or other hospital personnel, if desired. Assigning a given memory location to a given time of the day can be realized by periodically incrementing the address information transferred from the microcomputer 90 to the memory 92 over the address bus 96. Such address incrementing can be readily achieved by properly programming the microcomputer 90, and by taking advantage of the internal clock signals used therein.

The microcomputer 90 is likewise realized using a CMOS intergrated circuit, such as the model 80C48 microcomputer chip manufactured by numerous semiconductor manufacturers. It is submitted that with the assistance of the flow chart of FIG. 11, as well as the other information provided herein, those skilled in the microcomputer art could program such a microcomputer circuit in order to achieve the desired functions referred to herein.

Referring back to FIG. 6, it is noted that the entire transceiving circuitry is realized in a relatively small package. This is because the CMOS circuitry used is configured to achieve the desired function with only three or four integrated circuits, plus associated discrete components. Thus, the physical dimensions of the preferred embodiment of the portable unit 24 are only about five to six inches high, two inches wide, and three-quarter inches thick. As such, the device can be readily inserted into a pocket or attached to the belt of the user thereof.

Figures 8, 9:
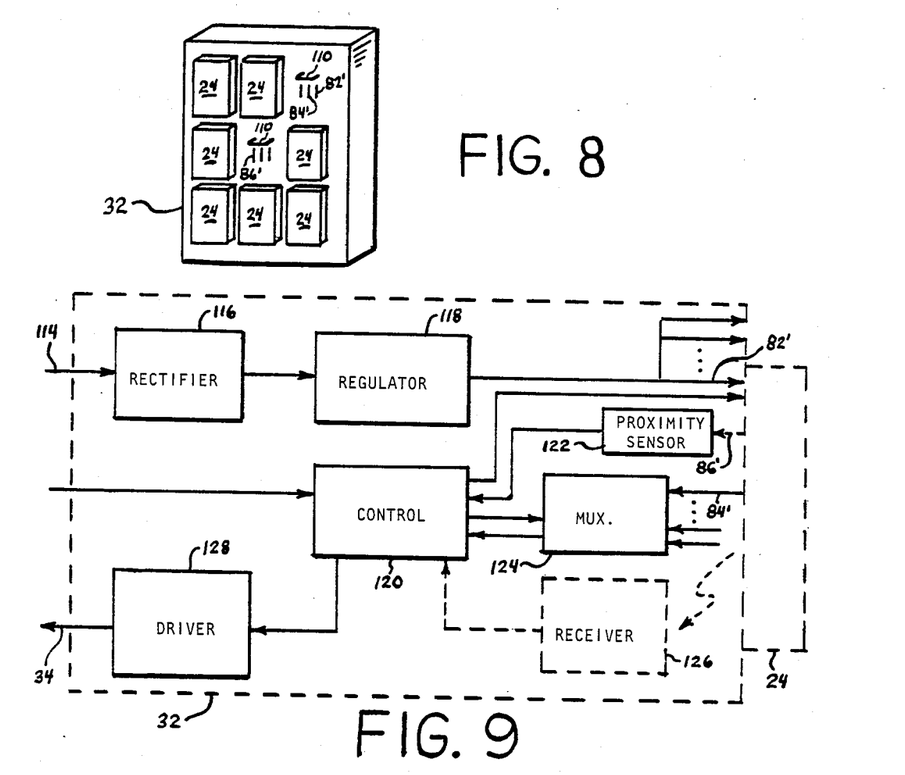
FIG. 8 is a perspective view of the charging and download unit of FIG. 1.
FIG. 9 is an electrical block diagram of the charging and download unit of FIGS. 1 and 8.

FIG. 8 depicts a perspective view of a charging and download unit 32 to which a plurality of portable units 24 have been attached. In the embodiment shown, up to nine portable units 24 may be attached to the single charging and download unit 32. However, a charging and download unit 32 adapted to handle any number of portable units 24 could be easily configured.

The unit 32 includes suitable means for attaching the portable unit 24 thereto, such as a protruding loop 110 to which the hook or clip 80 (FIG. 6) of the portable unit 24 may be attached. Also included are a plurilty of contacts 82', 84', and 86', adapted to make contact with the corresponding slots 82, 84, and 86 of the portable unit 24 when the portable unit 24 is installed (hung from) the unit 32. It is through these contacts that power may be transferred to the portable unit 24 for charging the power source 98 thereof, and for other desired functions associated with the charging and download operation. Of course, there exists numerous alternative methods and techniques for coupling electrical energy to and from the portable unit 24 once it is installed in the charging an download unit 32, such as inductive coupling as referred to previously. What is depicted in FIGS. 6 and 8 is only for illustrative purposes, and is not to be taken in a limiting sense.

FIG. 9 is a block diagram of the circuitry of the charging and download unit 32. Typically, the unit 32 is connected to a source of AC power 114. This AC power is rectified in a rectifier circuit 116, regulated in a regulator cicuit 118, and delivered to an appropriate connector 82' so that a specified charging current can be delivered there through to a portable unit 24 attached to the charging unit 32. If inductive coupling is employed, loops or turns of wire are respectively placed in the portable unit 24 and the charging unit 32. In close proximity to each other, these loops function as the primary and secondary windings of an air core transformer. Therefore, an alternating signal placed on the primary winding (the charging unit 32) is coupled to a secondary winding 83 of the portable unit 24, see FIG. 7, whereat it may be rectified, by a diode 85, regulated (if needed), and converted to a charging current for the power source 98 of the portable unit 24.

A control circuit 120, which control circuit may be realized using a CMOS microcomputer chip as is used in the portable unit 24, is provided to pass data to and from the memory 92 of the portable unit 24. A suitable proximity sensor 122 is used to sense when a portable unit 24 has in fact been placed on the charging and download unit 32. This proximity sensor 22 may be realized using numerous conventional techniques; but preferably it is something as simple as a contact 86' making contact with a connector 86 of the unit 24, thereby functioning as a switch whose contacts are closed when a portable unit 24 is installed on the unit 32. Alternatively, a microswitch could be used within the unit 32 so that a switch closure or opening would occur whenever the portable unit 24 is installed on the hook 110. Still alternatively, an inductively coupled signal, if of sufficient magnitude, could be used to indicate that the portable unit 24 was properly installed in the charging and download unit 32.

Data may be transferred from the portable unit 24 through the charging and download unit 32 to the CPU 28 either directly or indirectly. If a direct method is used, then data is directly transferred out of a download data out terminal 84 (FIG. 7) through a suitable connector 84' to a multiplexer 124 within the charging and download unit 32. A multiplexer is used in order to allow data from any portable unit to be transferred therethrough through the control element 120 to the CPU 28. If an indirect download method is used, then the contents of the memory 92 of the portable unit 24 are passed through the transceiver circuit 100 and transmitted to a receiver circuit 126 within the charging and download unit 32. When this indirect download method is used, the multiplexer 124 is not needed because the control element 120 controls which portable unit is being downloaded at any given time. Data received from the memory of the portable units 24 is transferred through a suitable driver circuit 128 to the CPU 28 over the channel 34.

Figure 10:
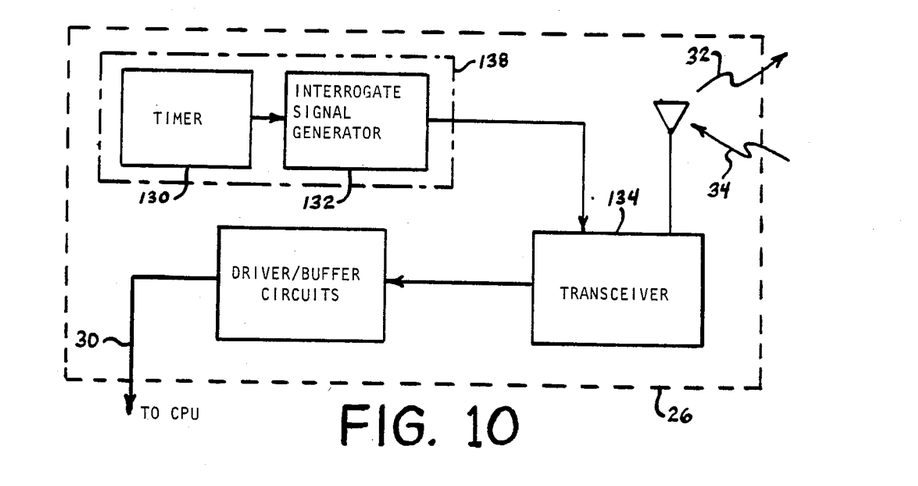
FIG. 10 is an electrical block diagram of the stationary unit of FIG. 1.

Referring next to FIG. 10, a block diagram of the stationary unit 26 is shown. This unit comprises a timer circuit 130 and an interrogate signal generator 132, coupled to a transceiver circuit 134. The timer circuit 130 determines how often an interrogate signal is generated. Once triggered by the timer circuit 130, the interrogate signal generator 132 sends the interrogate signal to the transceiver circuit 134 where it is transmitted from the stationary unit 126. If a portable unit 24 is within a specified distance of the stationary unit 26 when the interrogate signal is transmitted, then it responds with a response signal 34 that is likewise received by the transceiver circuit 134. This signal uniquely identifies the particular portable transceiver unit 24 that has been interrogated, and this information is sent through appropriate driver/buffer circuits 136 to the CPU over the communications channel 30. The timer circuit 130 and interrogate signal 132 could be realized using a CMOS microcomputer chip as is used in the portable unit 24. In such a case, a single control element (integrated circuit chip) 138 is all that is required for these elements. Preferably, the timer circuit 130 and the interrogate signal generator 132 are simply realized using the same configuration as is shown for the timer circuit 52 and encoder circuit 50 of the transmitting unit 20 (FIG. 3).

In the preferred embodiment, the frequency of the radio signals transmitted by the transmitting unit 20, the portable transceiving unit 24, and the stationary unit 26, is approximately 200 KHz. This is preferred operating radio frequency (RF) because it falls within a range that is not tightly regulated by the FCC (Federal Communications Commission), thereby precluding the need for special operating licenses. Further, 200 KHz is a frequency that does not interfere with other typical equipment used in the hospital environment. For some applications, it may be preferable to configure the portable unit 24 (which configuration is advantageously realized by properly programming the microcomputer 90) so that the response signal 34, transmitted in response to the interrogate signal 32, is a slightly different frequency, e.g. 250 KHz, in order to preclude any possibility of an error being logged into the memory of a portable unit 24 if two nurses, for example, happen to be within the specified distance of each other and the stationary unit 26 at the same time. Unique codes could also be used to prevent this possibility.

Advantageously, before any information is stored into a specified memory location of the portable unit 24, the portable unit 24 must be within the specified range of the transmitting unit 20 for the specified time. This is achieved by setting an appropriate qualification criteria before a given code is time-logged to the memory of the portable unit 24. Such criteria is readily set by programming the microcomputer 90. One such criterion requires that at least two consecutive reads indicate that the same code as been received. This means that the portable unit must be within the specified distance (e.g. the range of receiving the signal, which will typically be around five feet) for at least thirty seconds (assuming the transmitting unit transmits a signal every fifteen seconds) before the information is time-logged into the portable unit's memory. Another suitable criterion requires that at least three of the four signals received in any given minute correspond to the same code. This requires that the nurse or doctor actually be within the specified distance of the patient or other object for about a minute, and would provide enough flexibility so that one of the transmissions could have a read error associated therewith. Of course, as those skilled in the art will recognize, there are numerous error detecting and correction schemes that can be used in order to insure that the coded information is accurately transmitted from the transmitting unit 20 to a portable transceiving unit 24. Any of these techniques may be used and readily implemented within the portable unit 24 because of the flexibility afforded through use of the microcomputer 90.

Figure 11:
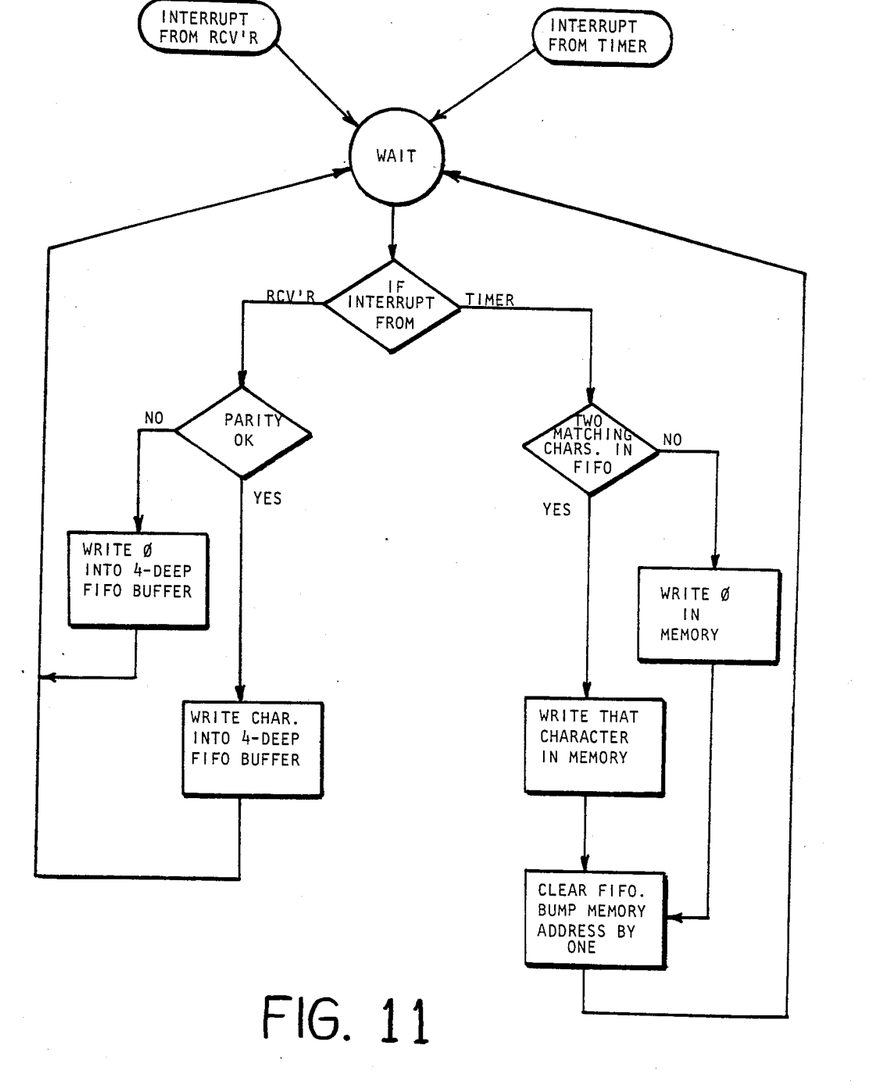
FIG. 11 is a simplified flow chart indicating a respresentative operating program that may be used by the CPU in FIG. 1 in conjunction with the system of the present invention.

The actual programming of the microcomputer 90, while not a trivial task, is viewed as one that can be carried out by those skilled in the programming art given the intended functions of the present invention. A simplified flow chart of the basic functions to be performed by the microcomputer 90 is shown in FIG. 11.

Advantageously, the useful life of the transmitting units 20 may be as long as the shelf life of the batteries used therein. This is because of the very low duty cycle associated with these transmitted devices. That is, the uniquely coded signal is only transmitted approximately every fifteen seconds, and the actual length of the word transmitted is only on the order of 30 msec. Therefore, for all practical purposes, the battery is hardly used at all. In particular, if some of the lithium batteries currently being sold on the market are used, the operating life of the unit 20 will be several years. Even if the standard silver oxide batteries, also readily commercially available, are used, the life of the device will easily exceed one year.

While the invention herein disclosed has been described by means of a particular embodiment thereof, numerous changes and modifications could be made thereto by those skilled in the art without departing from the spirit and scope thereof. The invention is intended to be limited only by the scope of the amended claims.

What is claimed is:

1. A system for recording the interaction between a plurality of objects, at least one of which objects moves relative to the other objects, said system comprising:
    a transmitting unit, said transmitting unit including: means for generating a uniquely coded radio frequency (RF) signal, means for transmitting said uniquely coded RF signal at prescribed intervals, and first attachment means for attaching the transmitting unit to a selected one of said plurality of objects; whereby said uniquely coded RF signal thereafter identifies said selected object; and
    a receiving unit, said receiving unit including: means for receiving said uniquely coded RF signal only when said transmitting unit and said receiving unit remain within a specified distance of each other for a specified time, second attachment means for attaching the receiving unit to another of said plurality of objects, and recording and timing means within said receiving unit for recording the receipt of the uniquely coded RF signal, including the time and interval during which the uniquely coded RF signal was received; whereby the recording and timing means within the receiving unit may be subsequently examined to indicate the time at which the receiving unit came within the specified distance of a particular transmitting unit and the duration of time during which said specified distance was maintained, thereby providing an indication of the interaction between the selected objects.

2. The system of claim 1 wherein the specified distance within which said transmitting unit and receiving unit must remain is the transmitting range of said transmitting unit.

3. The system of claim 2 wherein the specified range of said transmitting unit is less than 20 feet.

4. The system of claim 1 wherein the transmitting unit comprises
    encoding means for generating a selectable code;
    timing means for triggering the generation of said code by said encoding means at prescribed intervals;
    transmitting means for transmitting said code; and
    power means for providing electrical power to said encoding, timing, and transmitting means.

5. The system of claim 4 wherein said transmitting unit is encapsulatewd in an impervious substance, whereby the transmitting unit may be immersed in a sterilizing or cleansing liquid without adversely affecting the operation thereof.

6. The system of claim 4 wherein said prescribed intervals at which the encoding means are triggered by said timing means comprise periodic intervals.

7. The system of claim 4 wherein said prescribed intervals comprises every 10 to 20 seconds.

8. The system of claim 1 wherein said recording and timing means comprises
    a multiplicity of memory locations into which information corresponding to the uniquely coded signal received by said receiving unit may be selectively stored;
    first means for assigning a specified memory location to a specified time interval; and
    second means for storing the uniquely coded signal information into the particular memory location corresponding to the time interval during which the uniquely coded signal was received.

9. A system for recording the interaction between a plurality of first objects and at least one mobile second object, said system comprising:
    first means attached to said first objects for generating said transmitting a coded radio frequency (RF) signal at prescribed intervals, a uniquely coded RF signal being assigned for each of said first objects;
    second means attached to said second object for receiving said transmitted coded RF signal only when the second object is within a specified distance of one of said first objects;
    third means attached to said second object for storing the coded RF signal when received, and for noting and storing the time at which the coded RF signal was received, and the length of time during which the coded RF signal was received; and
    fourth means for selectively examining the stored information held in said third means, whereby the interaction between said second object and said first objects may be ascertained by noting the time periods during which a particular coded RF signal, corresponding to one of said first objects, is stored within said third means.

10. The system of claim 9 wherein said second means receives said transmitted coded RF signal only when the second object remains within the specified distance in accordance with a prescribed pattern.

11. The system of claim 10 wherein said prescribed pattern comprises receiving identical coded RF signals in succession for a prescribed number of the prescribed transmitting intervals of said first means.

12. The system of claim 10 wherein said prescribed pattern comprises receiving a prescribed number of identical coded RF signals within a prescribed group of the prescribed transmitting intervals of said first means.

13. The system of claim 9 wherein said prescribed intervals of said first means cause coded RF signal to be generated at least three times every minute.

14. The system of claim 9 wherein said third means comprises:

a memory element divided into a plurality of memory locations, each memory location being assigned to a prescribed time of the day as measured in desirable time increments; and means for storing the coded RF signal in the memory location corresponding to the time of day during which the coded RF signal was received.

15. The system of claim 14 wherein said fourth means for selectively examining the stored information held in said third means comprises a CPU;

means for down-loading the information stored in the memory locations of said memory element to said CPU; and programming means within said CPU for examining, sorting, and otherwise analysing the information down-loaded thereto.

16. The system of claim 9 wherein said second and third means comprise a portable self-contained transceiving unit having rechargable power means therein.

17. The system of claim 16 further including fifth means for selectively charging said power means.

18. The system of claim 17 wherein said fourth and fifth means comprise a charging and down-load unit including means for inserting said portable transceiving unit thereinto;

means for delivering a charging current to said power means once the portable unit is inserted into said charging and down-load unit; and means for down-loading the information stored by said third means to a CPU, said CPU being coupled to said charging and down-load unit.

19. The system of claim 18 further including means for recording the time at which the portable transceiving unit is inserted into and removed from said charging down-load unit, whereby said insert/remove times may be used to indicate the time-out/time-in of a user of said portable transceiving unit.

20. The system of claim 18 further including sixth means for sensing when said portable transceiving unit passes within a specified distance of a selectively positioned stationary transceiving unit coupled to said CPU, whereby information may be recorded in said CPU indicating the time at which the portable transceiving unit passed by the selected position of said stationary transceiving unit.

21. A recording device for use with a plurality of beacon units, each beacon unit being adapted to be attached on or near a selected object with which the recording device may interact, each beacon unit being adapted to intermittently transmit an identifying signal that is receivable within a specified range said identifying signal comprising a radio frequency signal, said recording device comprising:

receiving means for receiving said identifying signal if said recording device is positioned within the specified range of said beacon unit;

verifying means for determining that the same identifying signal is received over a period of time according to a specified criteria;

a storage control means located in said recording device for storing the verified identifying signal therein, said memory means comprising:

a multiplicity of memory locations where information can be stored, each memory location being assigned to a particular time period, and control means for storing the verified identifying signal in the respective memory location corresponding to the time period during which the uniquely coded signal was received; and examination means for examing the contents of said memory means.

22. A method for determining the interaction between a first group of objects and a second group of mobile objects, said method comprising the steps of (a) assigning a unique code to each one of the objects within said first group;

(b) transmitting a radio frequency (RF) signal modulated by said unique code from each of said objects of the first group;

(c) receiving said modulated RF signals at each one of said mobile objects of said second group only when the distance between any object of the first group and the respective object of the second group is less than a prescribed distance;

(d) demodulating the signals received by each object of the second group in order to recover the unique code therefrom;

(e) for each object of the second group, storing the unique code in a memory location corresponding to a time period during which the modulated signal was received;

(f) at the end of a desired period of time, examining the contents of the memory locations of each object of the second group in order to determine the presence or absence of a unique code recorded therein; and (g) assigning to each unique code found in step (f) the time period corresponding to the receipt of that code as determined by the storage location where that code was stored in step (e), which time period identifies the time at which the object of the first group having that unique code interacted with the mobile object of the second group of step (c).

* * * * *